United States Patent [19]

Singleton

[11] Patent Number: 5,016,145
[45] Date of Patent: May 14, 1991

[54] ILLUMINATED DISPLAY VEHICLE ORNAMENT

[76] Inventor: Kent A. Singleton, 7570 Hunters Woods Dr., Dunwoody, Ga. 30350

[21] Appl. No.: 420,303

[22] Filed: Oct. 12, 1989

[51] Int. Cl.$^5$ .............................................. B60Q 1/26
[52] U.S. Cl. ..................................... 362/80.1; 362/31; 362/223; 362/397; 362/812; 40/546; 40/552
[58] Field of Search ................. 362/61, 80, 83.2, 80.1, 362/812, 374, 375, 31, 397, 806, 217, 223, 224; 40/546, 556, 553, 541, 552

[56] References Cited

U.S. PATENT DOCUMENTS

| | | | |
|---|---|---|---|
| 1,422,669 | 7/1922 | Christofferson | 40/556 |
| 2,139,420 | 12/1938 | Richards | 362/80.1 |
| 2,365,076 | 12/1944 | Haywood, Jr. | 40/546 |
| 2,557,383 | 6/1951 | Keriver | 40/127 |
| 3,543,233 | 11/1970 | Neitzel | 362/80.1 |
| 3,605,303 | 9/1971 | Keichow | 40/546 |
| 3,905,017 | 9/1975 | Samra | 362/80.1 |
| 4,264,979 | 4/1981 | Gutowski | 40/593 |
| 4,443,832 | 4/1984 | Kanamori et al. | 362/84 |
| 4,574,269 | 3/1986 | Miller | 362/80.1 |
| 4,709,307 | 11/1987 | Branom | 362/103 |
| 4,791,745 | 12/1988 | Pohn | 40/546 |

FOREIGN PATENT DOCUMENTS 695042  7/1940  Fed. Rep. of Germany ........ 40/546

Primary Examiner—Stephen F. Husar
Assistant Examiner—D. M. Cox
Attorney, Agent, or Firm—Jerry T. Kearns

[57] ABSTRACT

An illuminated display vehicle ornament includes an elongated power cord having a cigarette lighter adaptor plug at one end for engagement with a vehicle lighter socket. In a first embodiment, a plurality of sockets are spaced along the power cord, and mount replaceable ornamental bulbs. Magnetic, hook and loop, and resilient clips are disclosed for securing the sockets within a vehicle interior. In a second embodiment, a base includes suction cups for engagement with an interior vehicle window surface and a display sign is releasably secured to the base. An elongated light bulb is mounted within the base in optical communication with the display sign. The display sign may be selected from a variety of available signs to allow replacement of different holiday displays.

1 Claim, 4 Drawing Sheets

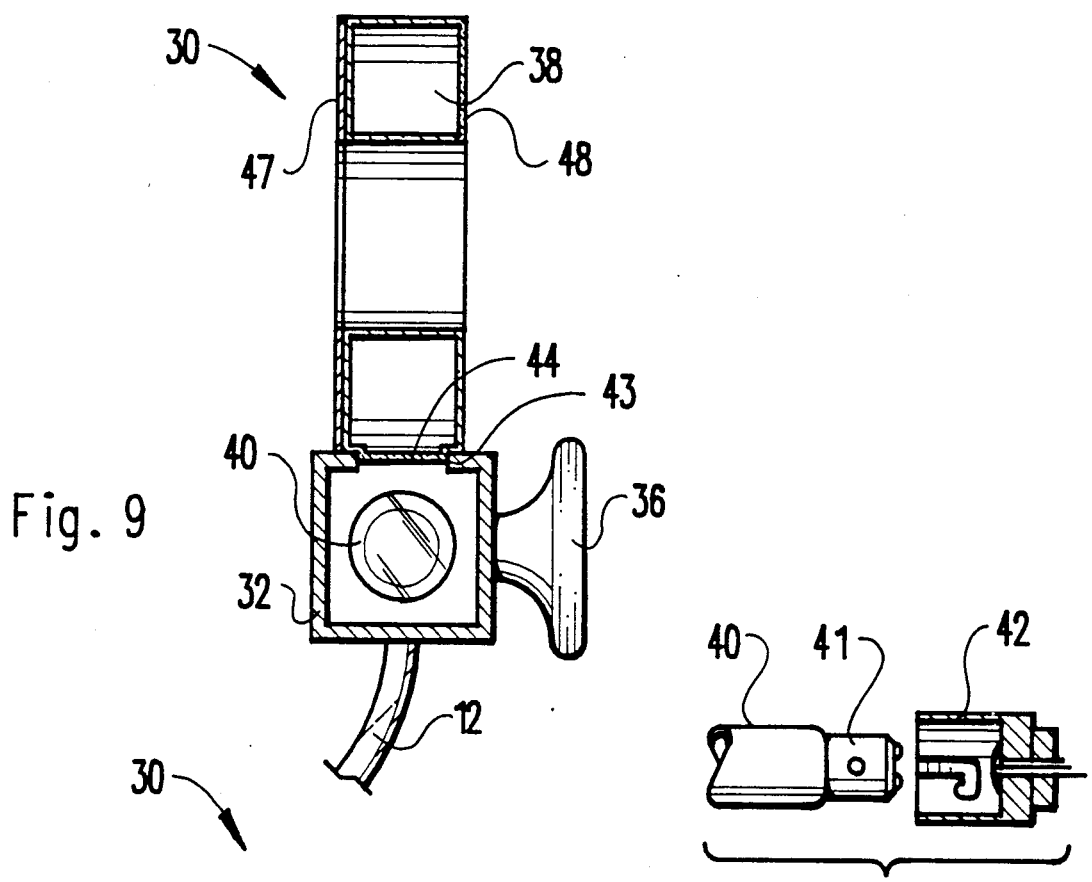
Fig. 9
Fig. 10
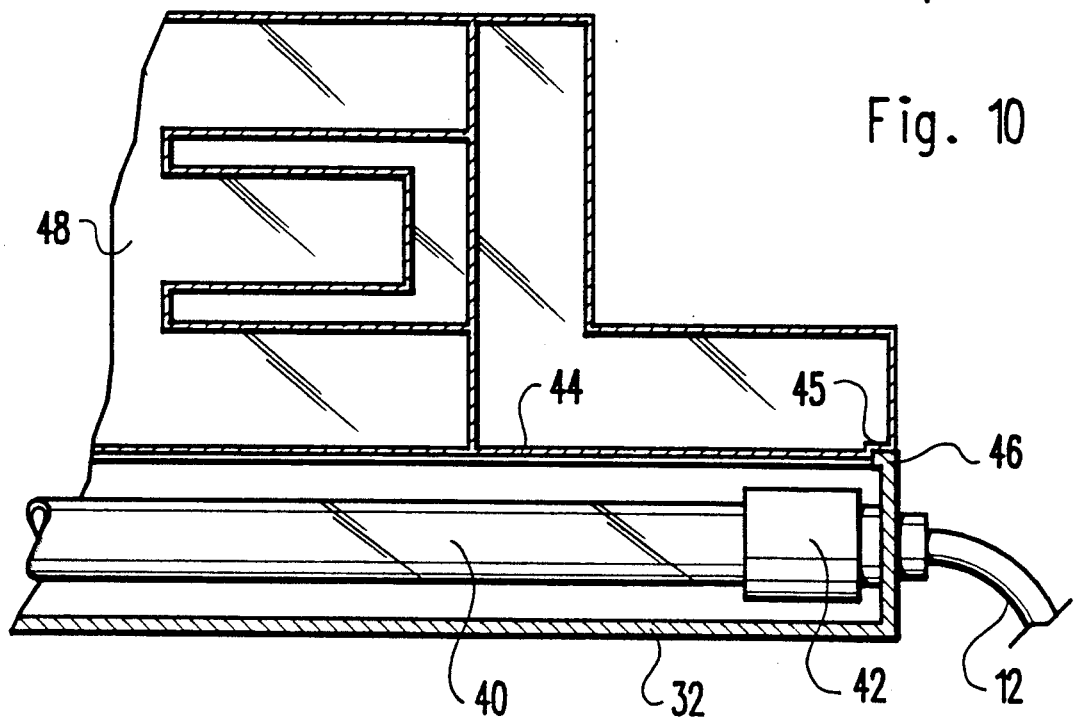
Fig. 11

ILLUMINATED DISPLAY VEHICLE ORNAMENT

BACKGROUND OF THE INVENTION

1. Field of the Invention

The present invention relates to illuminated displays, and more particularly pertains to illuminated display vehicle ornaments for decorating vehicles to celebrate Christmas and other holidays.

2. Description of the Prior Art

Various types of illuminated displays are known in the prior art. A typical example of such an illuminated display is to be found in U.S. Pat. No. 2,557,383, which issued to F. Kerwer on June 19, 1951. This patent discloses a balloon provided with a plurality of spaced sockets to form various illuminated display signs. U.S. Pat. No. 4,264,979, which issued to K. Gutowski on Apr. 28, 1981, discloses an illuminated display for mounting adjacent a vehicle window. The display is connected to a CB transceiver and identifies the operator and channel in use. U.S. Pat. No. 4,443,832, which issued to H. Kanamori et al on Apr. 17, 1984, discloses a self-illuminating ornament for attachment to a vehicle body to indicate a manufacturer's mark. U.S. Pat. No. 4,574,269, which issued to G. Miller on Mar. 4, 1986, discloses a visual communication display adapted for mounting adjacent a rear window of a vehicle. The device includes a plurality of light emitting diodes in a matrix arrangement which may be selectively energized to display various messages. U.S. Pat. No. 4,709,307, which issued to D. Branom on Nov. 24, 1987, discloses an article of clothing provided with an illuminated display. A set of light emitting diodes are mounted in a substrate and provided with a portable power source.

While the above mentioned devices are directed to illuminated displays, none of these devices disclose an ornamented display suitable for use in a vehicle to celebrate Christmas and other holiday occasions. Inasmuch as the art is relatively crowded with respect to these various types of illuminated displays, it can be appreciated that there is a continuing need for and interest in improvements to such illuminated displays, and in this respect, the present invention addresses this need and interest.

SUMMARY OF THE INVENTION

In view of the foregoing disadvantages inherent in the known types of illuminated displays now present in the prior art, the present invention provides an improved illuminated display vehicle ornament. As such, the general purpose of the present invention, which will be described subsequently in greater detail, is to provide a new and improved illuminated display vehicle ornament which has all the advantages of the prior art illuminated displays and none of the disadvantages.

To attain this, representative embodiments of the concepts of the present invention are illustrated in the drawings and make use of an illuminated display vehicle ornament which includes an elongated power cord having a cigarette lighter adaptor plug at one end for engagement with a vehicle lighter socket. In a first embodiment, a plurality of sockets are spaced along the power cord, and mount replaceable ornamental bulbs. Magnetic, hook and loop, and resilient clips are disclosed for securing the sockets within a vehicle interior. In a second embodiment, a base includes suction cups for engagement with an interior vehicle window surface and a display sign is releasably secured to the base. An elongated light bulb is mounted within the base in optical communication with the display sign. The display sign may be selected from a variety of available signs to allow replacement of different holiday displays.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially those who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved illuminated display vehicle ornament which has all the advantages of the prior art illuminated displays and none of the disadvantages.

It is another object of the present invention to provide a new and improved illuminated display vehicle ornament which may be easily and efficiently manufactured and marketed.

It is a further object of the present invention to provide a new and improved illuminated display vehicle ornament which is of a durable and reliable construction.

An even further object of the present invention is to provide a new and improved illuminated display vehicle ornament which is susceptible of a low cost of manufacture with regard to both materials and labor, and which accordingly is then susceptible of low prices of sale to the consuming public, thereby making such illuminated displays economically available to the buying public.

Still yet another object of the present invention is to provide a new and improved illuminated display vehicle ornament which provides in the apparatuses and methods of the prior art some of the advantages thereof, while simultaneously overcoming some of the disadvantages normally associated therewith.

Still another object of the present invention is to provide a new and improved illuminated display vehicle ornament which is easily removably installed within a vehicle interior.

Yet another object of the present invention is to provide a new and improved illuminated display vehicle ornament provided with a plurality of different fasteners for securement in a variety of different vehicles.

Even still another object of the present invention is to provide a new and improved illuminated display vehicle ornament including various different selectively installable display signs to celebrate various different holidays.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 9 is a transverse cross sectional view, taken along line 9—9 of FIG. 7.

FIG. 10 is an exploded detail view, partially in cross section, illustrating a bulb socket mounting arrangement utilized in the ornamental display of FIG. 9.

FIG. 11 is a detail view, partially in cross section, further illustrating the construction of the ornamental display of FIG. 7.

DESCRIPTION OF THE PREFERRED EMBODIMENT

Figure 1:
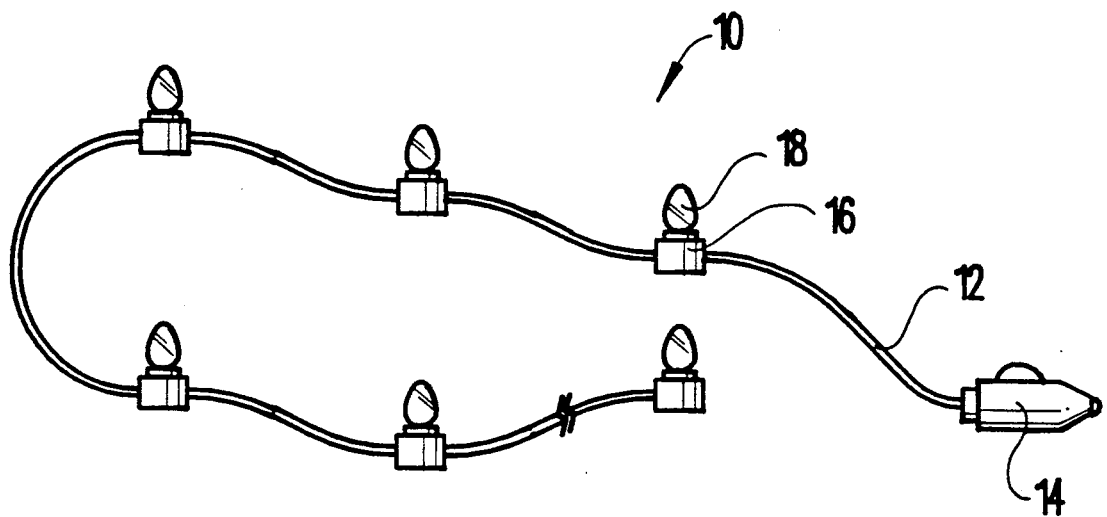
FIG. 1 is a side view illustrating a vehicle display ornament according to a first embodiment of the present invention.

With reference now to the drawings, and in particular to FIG. 1 thereof, a new and improved illuminated display vehicle ornament embodying the principles and concepts of the present invention and generally designated by the reference numeral 10 will be described.

More specifically, it will be noted that the first embodiment 10 of the invention includes a power cord 12 provided with a cigarette lighter adaptor plug 14 at one end. A plurality of generally cylindrical sockets 16 are connected in series along the length of the cord 12. Individual ornamental bulbs 18 are removably disposed within the socket 16.

Figure 2:
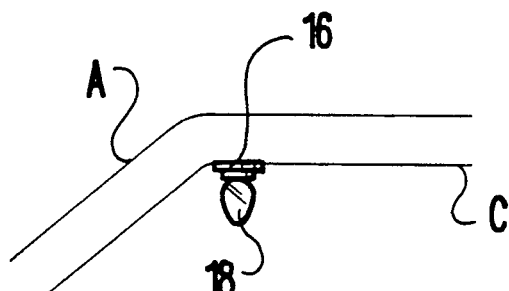
FIG. 2 is a detail view, illustrating the manner of mounting the illuminated display ornament of FIG. 1 within the interior of a vehicle.

As shown in FIG. 2, the sockets 16 are adapted for mounting to an interior ceiling portion C of a conventional automobile A. The lights 18 may be spaced around top portions of the vehicle window portion to provide an ornamental display.

Figure 3:
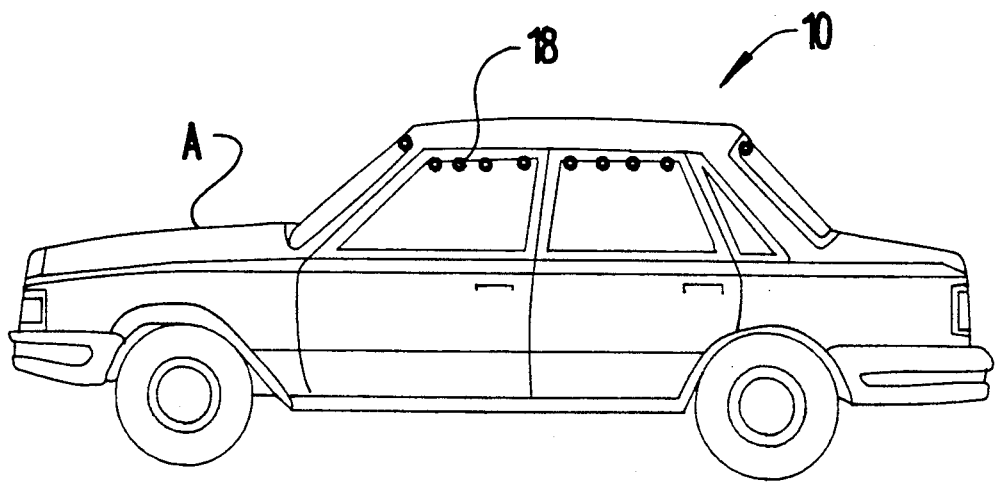
FIG. 3 is a side elevational view illustrating a vehicle provided with the illuminated display ornament of FIG. 1.

FIG. 3 illustrates a side elevational view of an automobile A, provided with a string of lights 18, of the type illustrated in FIG. 1.

Figure 4:
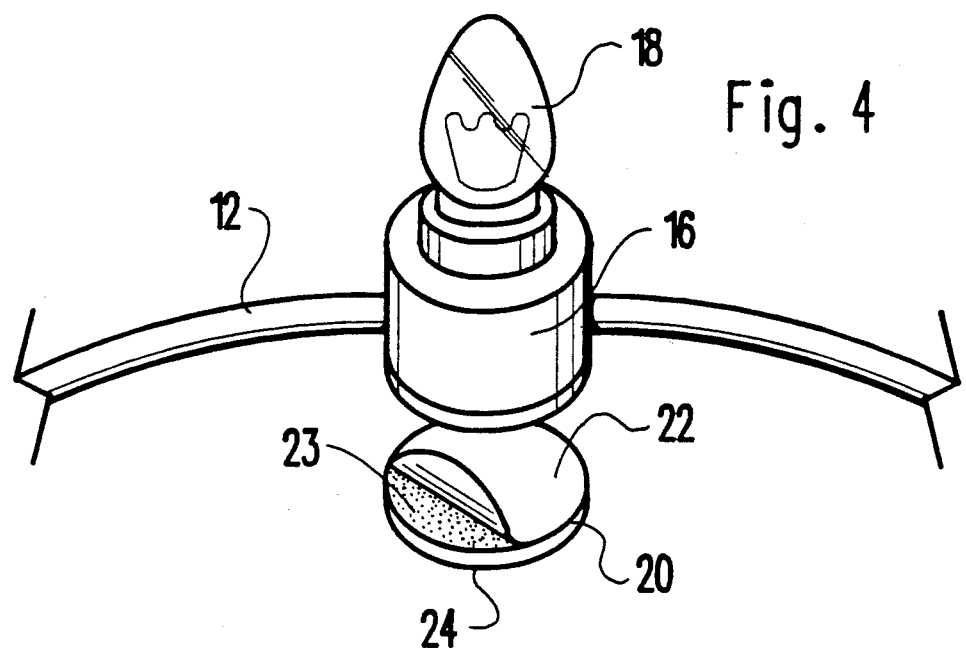
FIG. 4 is a detail view illustrating a fastener for securing an ornamental bulb socket to a vehicle interior.

As shown in FIG. 4, each of the sockets 16 may be provided with a magnetic disk 20. The magnetic disk 20 includes a first face provided with a peel-off strip 22 which exposes an adhesive coating 23. By removing the strip 22, the adhesive coating 23 may be utilized to secure the magnetic disk 20 to the bottom surface of the socket 16. The opposite face 24 of the disk 20 may be left exposed, for engagement with metal interior vehicle surfaces.

Figure 5:
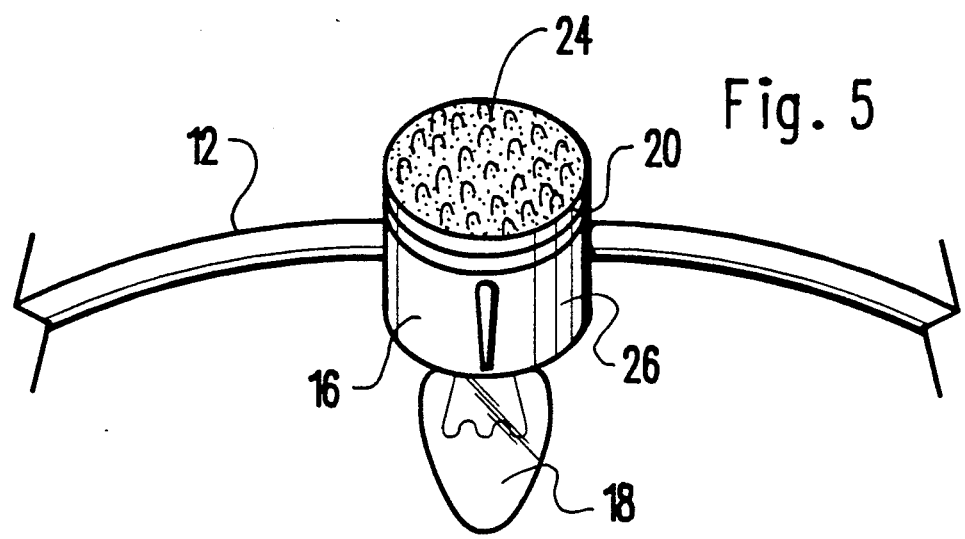
FIG. 5 is a bottom perspective view of a bulb socket provided with the fastener of FIG. 4.

Alternatively, as shown in FIG. 5, the magnetic disk 20 may be provided with a plurality of spaced hook or loop type fasteners, for engagement with conventional complementary formed fasteners which may be applied to various interior vehicle surfaces. The sockets 16 may additionally be provided with one or a plurality of circumferentially spaced resilient clips 26 adapted for engagement with interior ceiling rim portions surrounding vehicle door and window openings. Thus, the various fastening arrangements described may be employed singly, or in combination to provide a fastening arrangement suitable for use in a variety of diverse vehicles.

Figure 6:
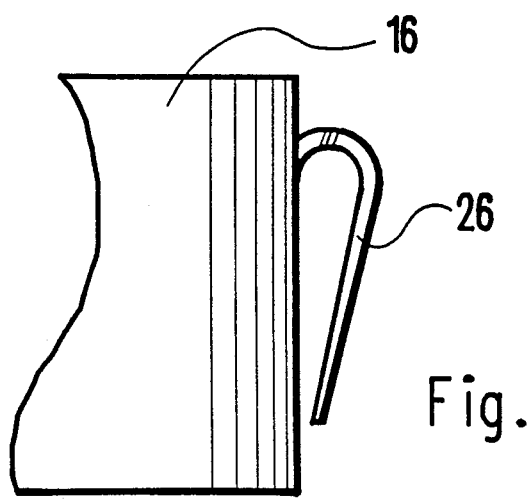
FIG. 6 is a side elevational detail view illustrating a bulb socket provided with a resilient clip fastener.

FIG. 6 is a detail view, illustrating the configuration of the resilient clip 26.

Figure 7:
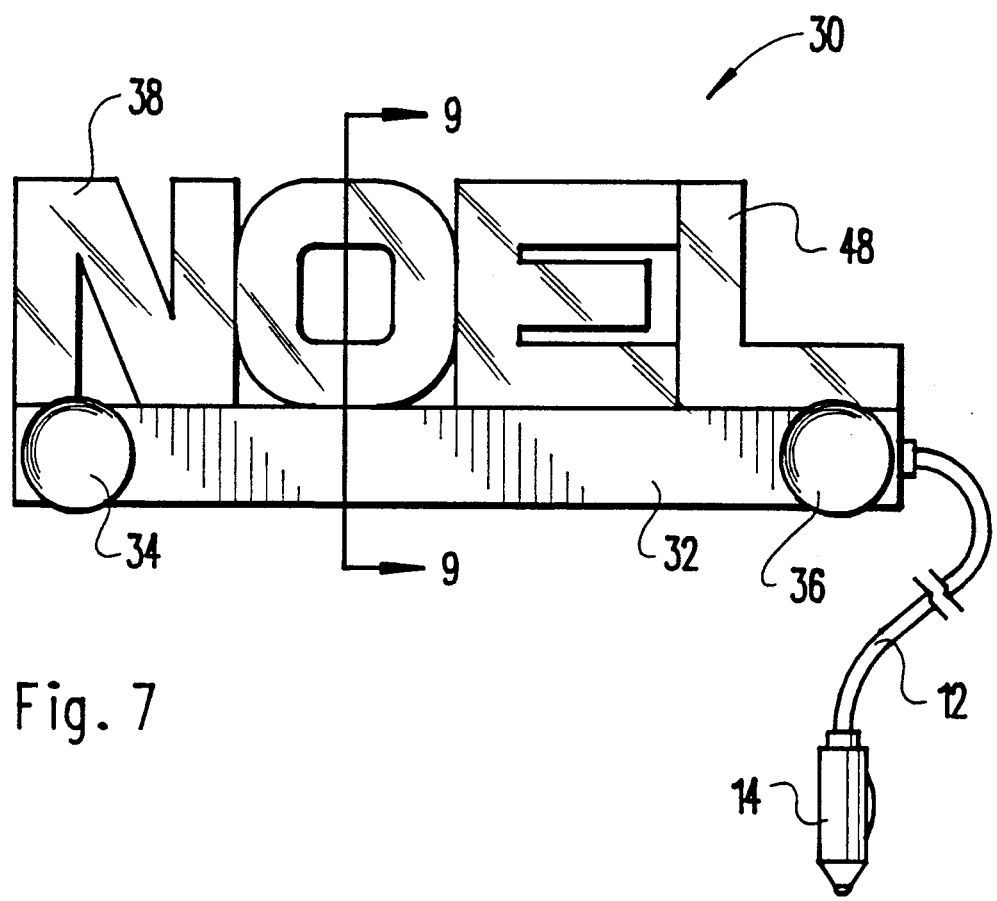
FIG. 7 is front view illustrating an illuminated display vehicle ornament according to a second embodiment of the present invention.

FIG. 7 illustrates a second embodiment 30 in which an elongated, generally rectangular base 32 is provided with a pair of spaced suction cups 34 and 36 adapted for securement to an interior vehicle window surface. The power cord 12 is connected at one end to a cigarette lighter adaptor plug 14, and at an opposite end to an elongated bulb which extends along the length of the base 32. The base 32 is preferably formed from an opaque material. A removable display sign 38 is releasably secured to an upper surface of the base 32, and includes a translucent plastic wall 48 which may be tinted in various colors to provide an ornamental display. The opposite face of the display sign 38 is formed from an opaque material so as to avoid interference with the vision of vehicle occupants.

Figure 8:
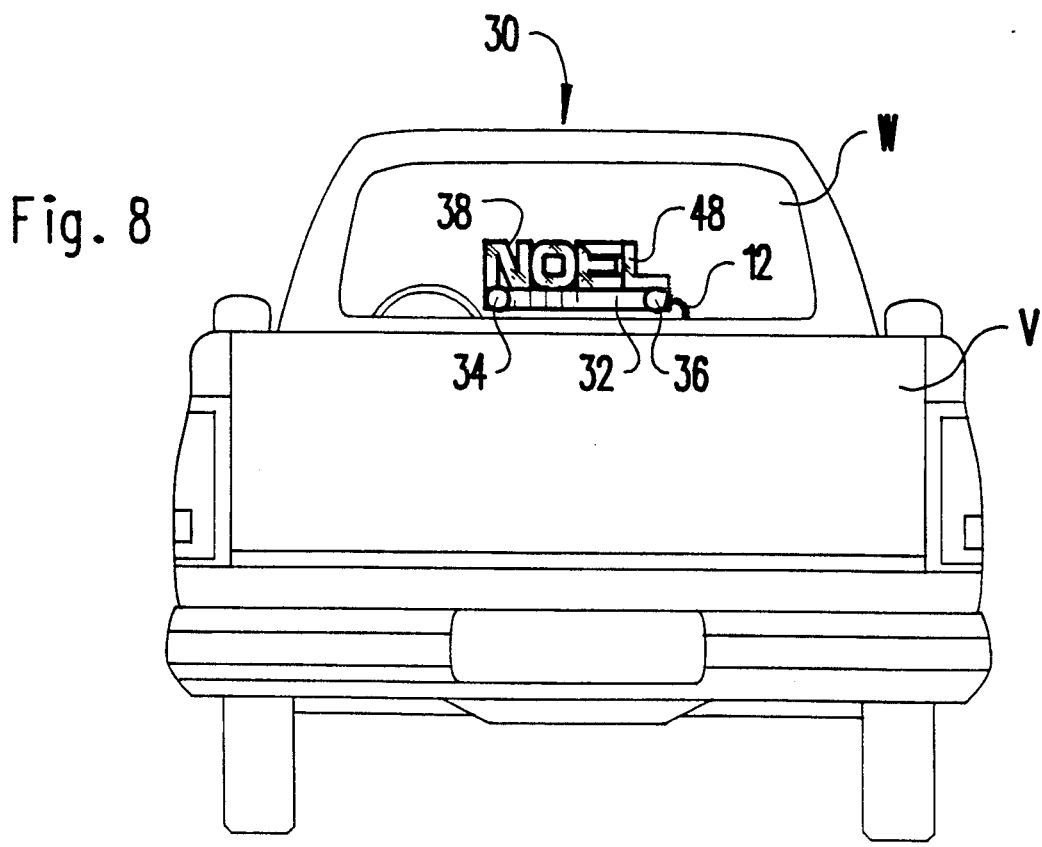
FIG. 8 illustrates the display ornament of FIG. 7 installed within a vehicle.

As shown in FIG. 8, the ornamental display 30 is adapted for mounting to an interior surface within a window W of a vehicle V. In the illustrated mounting arrangement, the translucent wall 48 of the display 38 is rearwardly directed, to provide an ornamental display message. It should be noted that the display sign 38 may be formed with a variety of different illuminated messages, suitable for use in various different holiday seasons. Additionally, the power cord 12 may be connected to the vehicle brake light circuit to provide a centrally mounted third brake light.

As shown in the transverse cross sectional view of FIG. 9, an elongated, generally cylindrical bulb 40, is disposed within the interior of the opaque rectangular base 32. An elongated slot 43 is formed in the top wall of the base 32, and receives a downwardly extending elongated rectangular projection 44 formed on a bottom surface of the replaceable display sign 38. Frictional engagement of the projection 44 within the recess 43 provides an interlocking, snap type securement of the display sign 38. Through this construction, the display sign 38 may be inexpensively replaced to provide various different messages. As described previously, the rearwardly directed wall surface 48 is preferably formed from a transparent material, while the forwardly directed wall surface 47 is formed from an opaque material to avoid disturbing night time vision of vehicle occupants. Additionally, the bottom wall formed by the projection 44 is formed from a transparent or translucent material to allow optical communication with the bulb 40. Various different reflective materials may be utilized to line the hollow interior of the base 32 to direct light from the bulb 40 through the projection 44 to illuminate the display sign 38.

FIG. 10 is an exploded detail view, partially cut away and in cross section, which illustrates the bulb 40 provided with a socket 41 which is replaceably engageable within a socket 42.

As illustrated in the cut away detail view of FIG. 11, the socket 42 is connected with the power cord 12 to illuminate the bulb 40. The base 32 includes an inwardly extending rim or ledge 46 at each end, which is received in frictional engagement with a complementary formed recess 45 formed in the display sign 38. This allows the display sign 38 to be securely yet releasably attached to the base 32.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An illuminated display vehicle ornament, comprising:
    an elongated power cord;
    a cigarette lighter adaptor plug at one end of said cord for engagement with a vehicle lighter socket;
    an elongated hollow rectangular base formed from an opaque material;
    a mounting socket in said base electrically connected to an end of said power cord opposite said adaptor plug;
    an elongated bulb in said mounting socket;
    suction cup means for securing said base to an interior vehicle window surface;
    releasable fastening means for securing a selected one of a plurality of different display signs to said base;
    said display sign including a plurality of letters formed by a hollow housing having a forwardly directed opaque wall and a rearwardly directed translucent wall;
    said fastening means including an elongated rectangular slot extending along a top surface of said base and a cooperating frictionally engaging elongated rectangular projection extending along a bottom surface of said housing;
    said projection formed from a translucent material to transmit light from said bulb in said base to said housing and through said rearwardly directed translucent wall;
    a pair of inwardly extending ledges on said base, formed at opposite ends of said slot; and
    cooperating recesses formed at opposite ends of said bottom surface of said housing for engagement with said ledges.

* * * * *